(12) United States Patent
Sakarya

(10) Patent No.: US 6,853,911 B1
(45) Date of Patent: Feb. 8, 2005

(54) DOWNLOADING GEOGRAPHICAL DATA TO A MOBILE STATION AND DISPLAYING A MAP

(75) Inventor: Taskin Sakarya, Stettiner Str. 41, Korntal-Muenchingen (DE), D-70825

(73) Assignee: Taskin Sakarya, Korntal-Muenchingen (DE)

(*) Notice: Subject to any disclaimer, the term of this patent is extended or adjusted under 35 U.S.C. 154(b) by 111 days.

(21) Appl. No.: 10/110,187

(22) PCT Filed: Aug. 3, 2000

(86) PCT No.: PCT/EP00/07534
§ 371 (c)(1),
(2), (4) Date: Apr. 10, 2002

(87) PCT Pub. No.: WO01/28270
PCT Pub. Date: Apr. 19, 2001

(30) Foreign Application Priority Data

Oct. 12, 1999 (EP) ............................................ 99120291
Feb. 3, 2000 (EP) ................................. PCT/EP00/00852

(51) Int. Cl.[7] ........................... G01C 21/32; H04B 1/00
(52) U.S. Cl. ...................................... 701/208; 455/524
(58) Field of Search ........................ 701/201, 207–209, 701/212–213, 216; 455/524, 456, 432; 340/988–990, 993, 995; 342/357.01, 357.06, 357.1, 357.13

(56) References Cited

U.S. PATENT DOCUMENTS

| 5,890,070 A | * | 3/1999 | Hamada ...................... 455/524 |
| 5,899,953 A | * | 5/1999 | Urahashi ..................... 701/117 |
| 6,163,752 A | * | 12/2000 | Sievers et al. .............. 701/212 |
| 6,282,490 B1 | * | 8/2001 | Nimura et al. ......... 340/995.14 |

* cited by examiner

Primary Examiner—Thu V. Nguyen

(57) ABSTRACT

A mobile station (1) of a mobile communication network system (2), comprising a GPS/GSM or UMTS based geographical position localising module (3) for localising the geographical position (24c) of the mobile station, which has storage means for storing geographical related base data, and display means (4) for displaying geographical related base data as a map (24) or as a text string, is characterised in that the geographical related base data displayed has been at least partly provided by wireless transmission from the network system and is limited to a predetermined extent depending on the geographical position, travel modus and speed of the mobile station, and the mobile station itself calculates the geographical position which can be presented to others during call set-up or with SMS services and the mobile station can do routing using a navigational algorithm implemented in location finder module (31) of the mobile station.

10 Claims, 4 Drawing Sheets

DOWNLOADING GEOGRAPHICAL DATA TO A MOBILE STATION AND DISPLAYING A MAP

BACKGROUND OF THE INVENTION

1. Field of the Invention

A mobile station comprising a GPS and/or GSM/UMTS based localising nodule for displaying location dependent data and related information, a corresponding mobile communication network system, and a method of operation within this system.

The present invention relates to a mobile station comprising a GPS and/or GSM/UMTS based localising module for displaying location dependent data, preferably Cell or Local Area dependent data, and related information, a corresponding mobile communication network system, and a method of operation within this system according to the preambles of the accompanying independent claims.

2. Description of the Related Art

Geographical position localising methods and modules are known for example from the satellite based Geographical Positioning System (GPS) standard. They are used for example in navigation systems. Some map information is provided by data storage means, for example CD-ROMs, or can be downloaded from a database, for example via internet The problem arises that the map and other data loading via a Compact Disk (CD) is extensive and bulky, internet connections for loading are not everywhere available and are expensive since overall loading time is enormous, and loading of comprehensive world date is impossible due to storage or memory capacity limitations. For example the map data potentially necessary for the user of the mobile station either exceeds the capacity of presently available portable data storage means, such as plug-in cards, or results in large and heavy mobile station equipment U.S. Pat. No. 5,890,070 shows a navigation terminal using a radio communication device. For navigation purposes, the navigation terminal connects via a radio channel to a radio base station that covers the current position of said navigation terminal. Said radio be station transmits its own identification number and information concerning a target of said navigation terminal via a COMMUNICATION PROVIDER NETWORK to a central AREA INFORMATION DATABASE. Said central AREA INFORMATION DATABASE calculates waypoints of said navigation terminal and transmits back the calculated information which may include also map information via said COMMUNICATION PROVIDER NETWORK to said radio base station and further to said navigation terminal. The geographical position of said navigation terminal is determined by the AREA INFORMATION DATABASE only using the identification number of the corresponding base station and subsequently provided to said navigation terminal.

EP 0 788 084 Al discloses a navigation system for vehicles wherein street name and street number of a waypoint or of a point nearest to the waypoint is located and input by an input means. The desired waypoint street name and street number are entered and stored as the waypoint name. Thus it is possible to pinpoint the position of the waypoint.

EP 0 86U 688 A 1 discloses a method of displaying an electronic map within an agricultural vehicle as for example a tractor or a combine harvester.

The map information comprises terrain and site specific information such as border lines or obstacles.

BRIEF SUMMARY OF THE INVENTION

It is an object of the present invention to provide a mobile station, a corresponding mobile communication network system, and a method of operation within this system, which provides the necessary geographical related base data in a suitable form at the mobile station with low costs, low and small size. It is a further object to combine GPS and other mobile based localisation means with mobile communication network system in such a way that loading and handling of the localisation data and local area information data are done in a very efficient way.

The object is solved by the subject matters of accompanying independent claims. Some preferred embodiments of the invention are defined in the accompanying dependent claims.

Mobile station can display a position marked out map, a position text string, and/or Local Area information data at an idle mode, i.e. at a standby mode. Thus there are no extra costs for the user of the mobile station, and no extra work involved in trying to find the data needed, such as maps, location surrounding or Local Area data-etc., or in loading data from a CD or via an internet connection. Only when data of a special area is needed or normal loading process is interrupted, then a service call loading can be activated. Otherwise the loadable data is available as network broadcasts, similar as known from Video Text in the technical area of television, or loaded by network during the Local Area Update Procedure known from the GSM standard.

A check on possibly already existing stored version of data at said mobile station, e.g. by comparing version numbers, date of loadable parts etc., can be performed. Loading is done only if the mobile station has an older version or missing parts. In case of a Location Update Procedure loading or Service Call loading, mobile station informs the network about the existing data version of the Local Area and the network decides if and what to load. In case of Network Broadcast Service loading mobile station decides on downloading or not. Latest mobile available data are stored at said mobile station even after power-off, the amount depending on the availability of the memory capacity of the mobile station end equipment.

BRIEF DESCRIPTION OF THE SEVERAL VIEWS OF THE DRAWINGS

Embodiments of the invention can be seen in the accompanying figures, wherein

FIG. 1 shows a mobile station 1 of a mobile communication network system 2, said mobile station 1 comprising a geographical position localising module 3 and display means 4 for displaying map data as a map 24 (FIG. 2) and a geographical position 24c of said mobile station 1 on said map 24.

Figure 1:
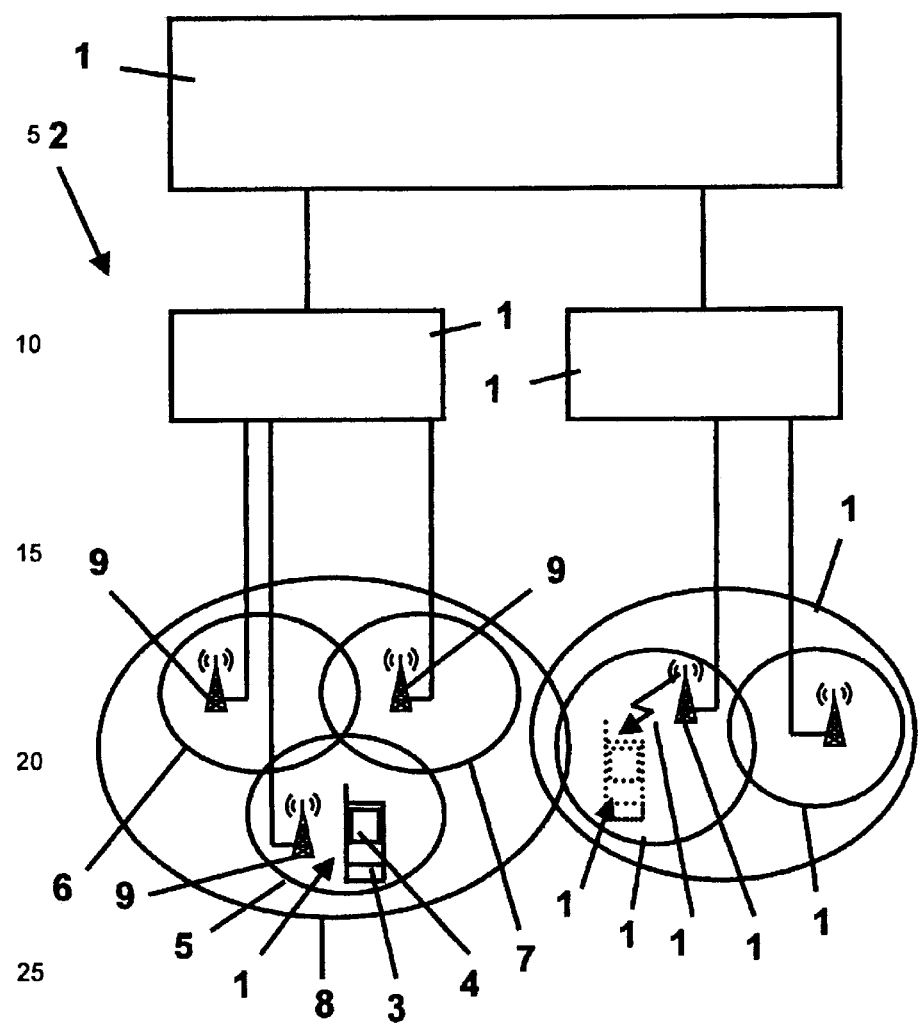
FIG. 1 shows a mobile communication network system with a mobile station according to the present invention.

Always the same blocks of data assigned to the cell at the time, are transmitted to all the mobile stations within the cell. Blocks of this base data are grouped for example in 4 or more categories:

(a) Map data blocks, (b) Localisation related text string data blocks,
(c) Area Information data blocks,
(d) Dynamic (often changing) data blocks, e.g. advertisement data, and
(e) Others.

Therefore, all mobile stations within one cell receive the same geographical related base data. Each mobile station can filter out the individual and for example user profile or travel modus specific geographical related base data.

In the shown embodiment the map 24 corresponds essentially to the network cell 5 or a part of it. Network cell 5 and further network cells 6, 7 are forming a local area 8. The network antennas 9 assigned to the cells 5, 6, 7 are served by a Base Station Subsystem 10 which is part of Use backbone network 11 which is structured essentially as known from the prior art. A second Base Station Subsystem 12 serves second network antennas 13 assigned to network cell 14, 15, respectively, forming a second local area 16.

When the mobile station 1 travels from the first local area 8 to the second local area 16, according to the prior art a location update procedure takes place in order to provide connectivity of mobile station 1 with the mobile communication network system 2. During or following this location update procedure, i.e. without any active call from the mobile station 1, the mobile station 1 receives from network antenna 13 of cell 14 of the second local area 16 an update for map data. The map data including localisation data as street names, building names etc and local area background data as for example hotels, restaurants, events etc. can be provided by the network system 2 as a broadcast service and the mobile station 1 selects the required information out of the broadcasted information.

In addition or as an alternative, during or following this ion update procedure the mobile-station 1 can inform the network antenna 13 whether it has already stored map data information of cell 14 and/or second local area 16. If yes, the date and/or version number of the map data is checked. If not or if the version number or date of the map data in the mobile station 1 indicates that the map data in the mobile station 1 is obsolete, i.e. a new version for the map data exists, the network antenna 13 transmits 17 map data or updated map data. In the case of an update, only changed data have to be transmitted 17. Mobile station 1 can communicate with the network antenna 13 and particularly can provide information about preferences concerning the information to be loaded during location update procedure. For example if the localising module 3 has calculated that the travel modus of mobile station 1 is "by car" with high velocity, mobile station 1 requires from network antenna 13 with high priority a street map of large scale and low resolution but with traffic information according to the present traffic situation.

Figure 2:
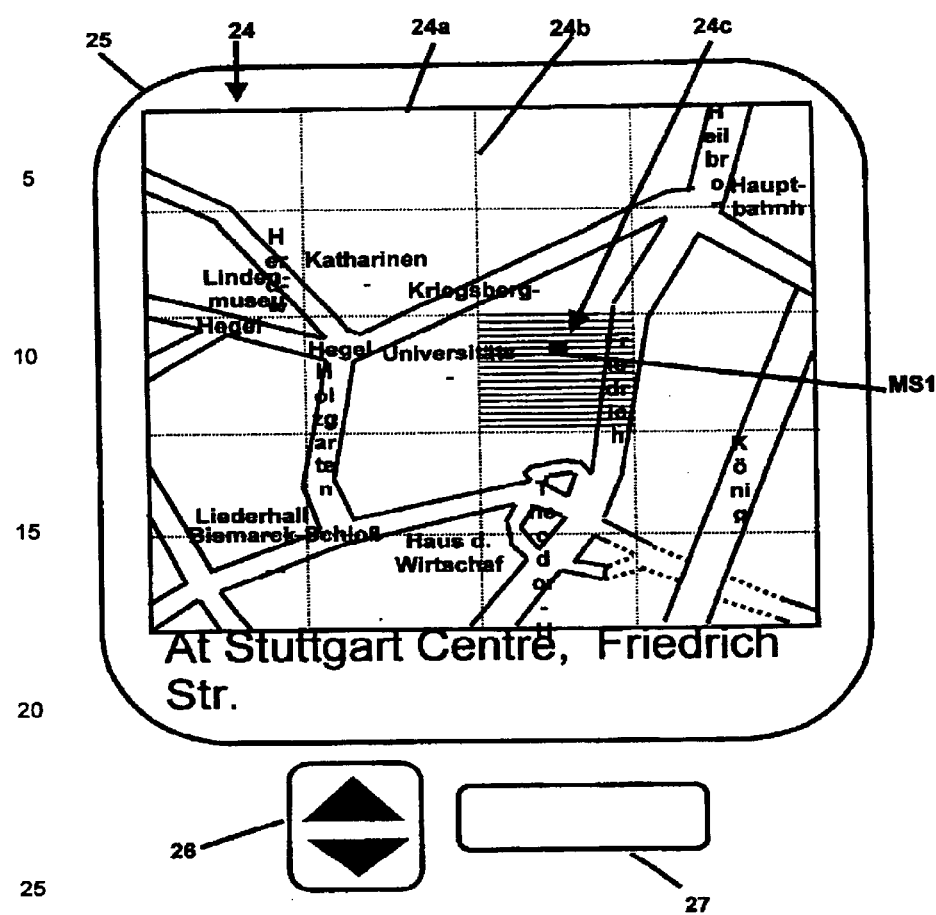
FIG. 2 shows the mobile station displaying an extract of a city map.

FIG. 2 shows the display 25 of the mobile station 1 displaying an extract of the city map 24 and additionally names and locations of streets and characteristic buildings. The city map 24 can be displayed on a LCD-display 25 of the mobile station 1 with an overlying grid comprising equidistant orthogonal lines 24a, 24b. A field comprising the geographical position 24c of the Mobile Station 1 can be marked on the display 25 in any appropriate manner. In addition or in substitution, the geographical position 24c can be displayed and one or various options can be offered to the user of the Mobile Station 1. The options can be selected for example by a touch sensitive means or by a rocker switch 26. The selected option can be activated for example by a further touch sensitive means or a button 27.

Figure 3:
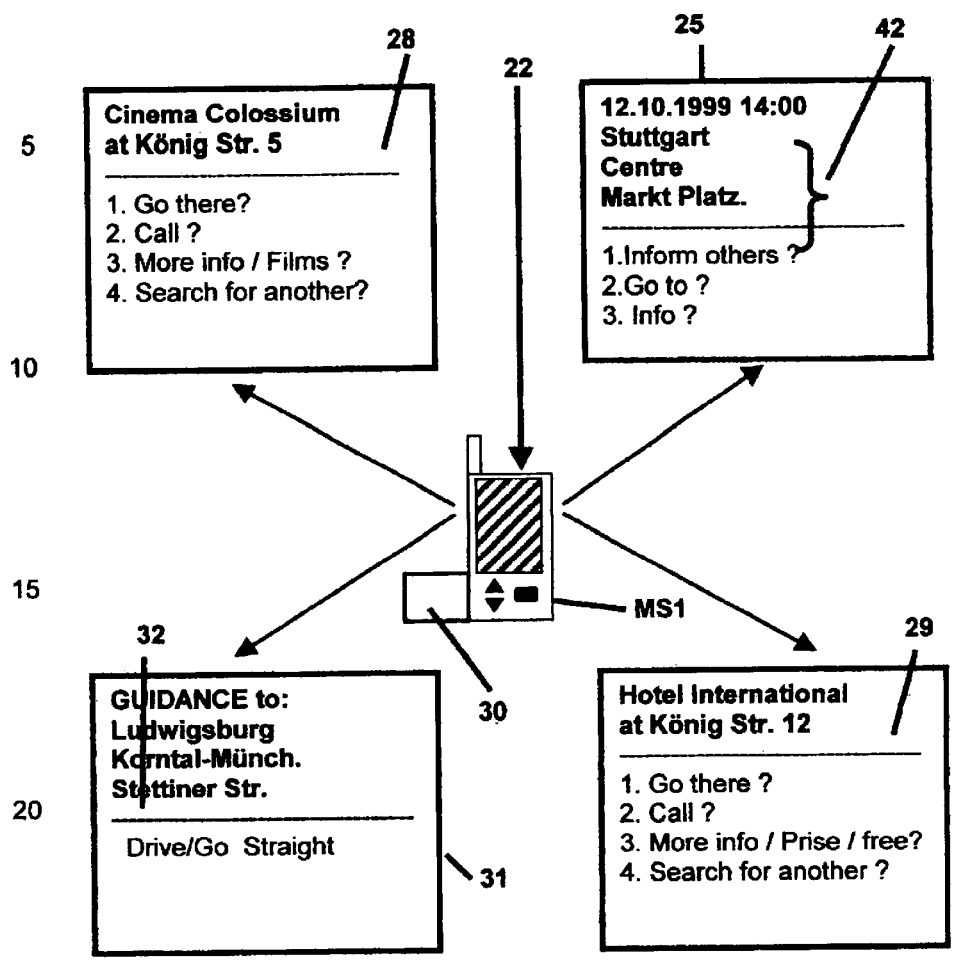
FIG. 3 shows a schematic view of various options displayed on the mobile station.

FIG. 3 shows a schematic view of various options displayed on the Mobile Station 1 according to the present invention. In the upper right corner is shown a display 25a comprising date and time as well as information 42 about the geographical location, which is in this example the market place in Stuttgart Centre, as a text string. Possible options for this display 25a are: 1. INFORM OTHERS?, 2. GO TO?, and 3. INFO?. INFORM OTHERS is a prompt for initiating a transmittal of the geographical location to a receiver, for example to another mobile station. The transmittal of the geographical location can be made via a message channel, for example via SMS. In addition or in substitution for example a voice call can be initiated, particularly in an emergency case.

The Mobile Station 1, if applicable in combination with the network system 2, is provided with an area background information module 30 which is only schematically indicated in FIG. 3 and which contains background information, in particular comprising city guide information, about at least one geographical area and is accessible via the geographical location of the mobile station 1. In other words, the area background information module 30 can be used so as to display location dependent information, that is information which is received only by mobile stations which are located in a specific geographical area. The background or city guide information can be the same for all mobile station 1, for example can comprise all information available, or can be specific for a user of the mobile station 1 according to a user information profile.

There are shown two options which are possible using the area background information module 30. In the upper left corner, there is shown a search location 28, namely a cinema COLOSSIUM at a certain address KOENIG STR. 5. In the lower right corner, there is shown a further search location 29, namely a HOTEL INTERNATIONAL at the address KOENIG STR. 12. In both cases, information about the cinema and the hotel, respectively have been transmitted via a message channel (e.g. SMS) or broadcasted to all mobile stations which are in the particular geographical area of that cinema and hotel, continuously or on request, respectively. This type of advertising can be made interactive by the user of the mobile station 1. A prompt could invite to call or to ask for certain information about the search locations 28, 29, respectively.

Another module that is implemented in the network system 2 and the mobile station 1 is a location or path finder module 31 which is schematically indicated in FIG. 3 at the lower left.

If the owner of the mobile station 1 wants to go to a certain search location, like the search location "STETTINER STRASSE"32, the location finder module 31 will show the direction where to go. Namely, the location finder module 31 has access to location lists and tables and/or maps and/or city guide information, including for example street maps, subway train schedules, etc., about a geographical area and is capable to assist the user of the mobile station 1 in finding the search location 32 in said geographical area. The search location can be either searched via a search option corresponding to the upper right corner of FIG. 3, or can be directly entered via the keys (not shown) of the mobile station 1. The search location can be selected from a given list of countries, cities, location areas and streets. The location finder module 31 knows the geographical location of the mobile station 1, and, via access to location tables and/or maps and/or city guide information, knows where the search location is boated. A navigational algorithm implemented in the location finder module will calculate the direction to go from the location of the mobile station and indicate this direction on the mobile station display 25. For this purpose, the mobile station can comprise further a compass. In a refinement, the user is shown streets which he has to take in order to arrive at the search location 32. Such option is possible via access to map information.

Figure 4:
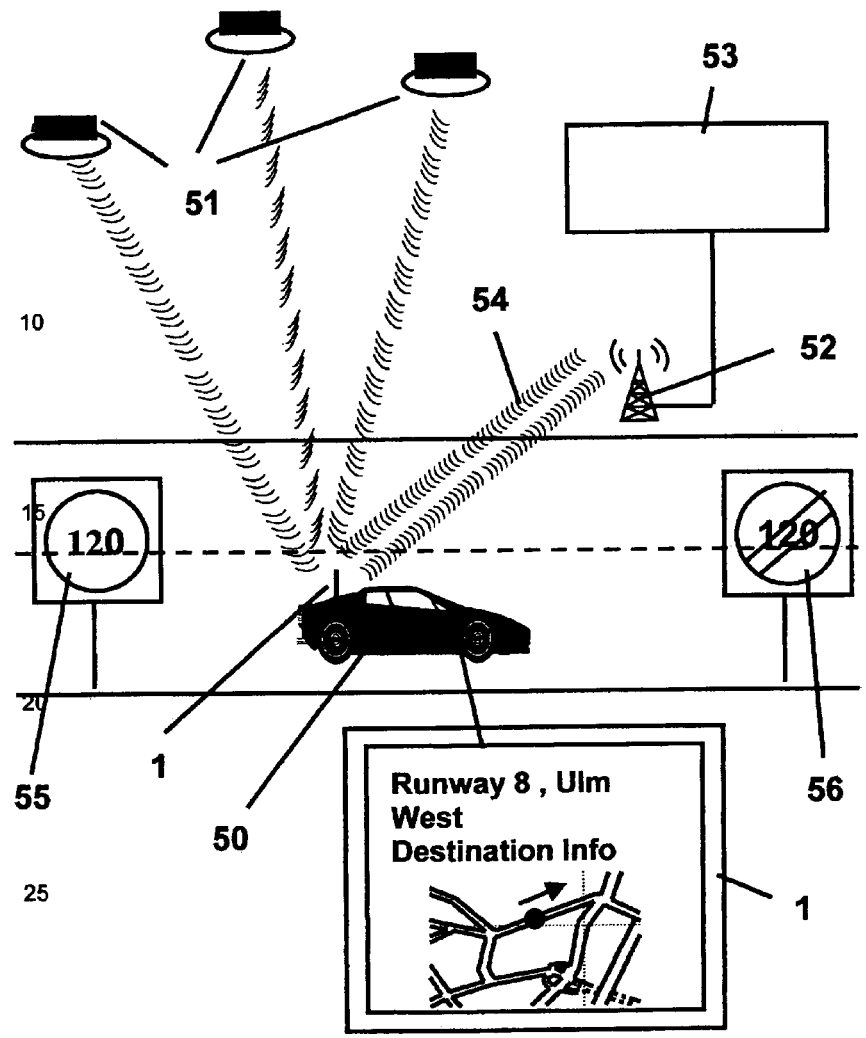
FIG. 4 shows the mobile station operated in a vehicle

FIG. 4 shows the mobile station 1 operated in a vehicle 50 and displaying destination information together with jam and rerouting traffic information. Mobile station 1 receives with its antenna 1a GPS information from satellites 51 according to the known GPS system. From a possibly dedicated network antenna 52 controlled by a possibly dedicated substation 53 of the network system 2 the mobile station 1 receives information 54 not only concerning jam and rerouting traffic information but also concerning a present speed limit 55. Antennas 52 can broadcast all information, e.g. all speed limit information 55, 56 presently valid in its cell and the mobile station 1 itself selects from all this information the relevant information according to its present location. In addition or alternatively mobile station 1 can send its present location to the antennas 52 and receive from antennas 52 subsequently only the relevant information concerning jam, rerouting, speed limits etc. Mobile station 1 can control the engine of vehicle 50 awarding to the received speed limit information 55, 56. Meeting the given speed limit 55 can be chosen as an obligation or as an option by the dedicated network substation 53 and thus for example by th traffic police, or by the driver of the vehicle 50 as the user of mobile station 1.

DETAILED DESCRIPTION OF THE INVENTION

The invention relates in one embodiment to a mobile station of a mobile communication network system, said mobile station comprising a geographical position localising module for localising a geographical position of said mobile station, storage means, preferably a built-in or plugs in Integrated Circuit memory card, for storing geographical related base data, and display means for displaying geographical related base data as a map and/or a text string. The geographical related base data displayed on said display means has been at least partly provided by wireless transmission from said network system and is limited to a pre determinable extent depending on said geographical position of the mobile station. The geographical data has been at least partly provided, in particular in addition to already available data at the mobile station from previous loading, by a Network Broadcast Service, and/or by a Location Update Procedure, and/or by a Network Service Call.

For the geographical position localising module, a global positioning system (GPS) module as known in the prior art providing position information as geographical coordinates can be used and/or a GSM/UNITS localising system for mobile stations using signal strength measurements, for example of own and/or neighbour cell signal strength, and/or base stations antenna position information, and/or base stations to mobile stations distance information, for example based on timing advance (TA) measurements, and/or other position characteristic measurements as for example disclosed in the parallel pending European patent application no. 99 120 291.2, filing date Oct. 12, 1999, and the parallel pending PCT-application no. PCT/EP00/00852, filing date Feb. 3, 2000. Mobile station can employ one or the other or both positioning modules depending to its present surroundings.

The geographical position calculation can be performed by the mobile station itself, i.e. only assistance from the network system is performed by a general broadcast information of normal operational and location dependent information to all the mobile stations within the network system cell. The position is computed in the mobile station, in particular translated into localization data as for example translated into a street or building name in which the mobile station is presently located, and local area background data and information is added if necessary or desired, for example data of restaurants, hotels or events nearby to the present location of the mobile station. All this information is shown to the user on said map or as name string. The mobile station can provide guidance information about how to reach to a desired destination; in particular the mobile station can display a location dependent categorical information and combine this information with the localization system for further guidance. The mobile station can load all the required information such as maps, area information data etc. as local area dependent. This makes the loadable and manageable size of the data relatively very small. It also makes the processing, i.e. the programming on the mobile station side more easy.

The geographical position and/or localisation data of the mobile station can be send to others as location name string and/or geographical co-ordinates, e.g. by using short message service (SMS) and/or set-up during the active call set-up phase, as presentation or restriction of calling or called mobile station geographic position.

The map data is transmitted by the GSM/UMTS mobile network within a GSM/UMTS cell and covers a predetermined range, normally the cell being at the centre. The actual contents of the map data can be limited to the type and position of the cell. This cell centered map data loading is specially considered in case of network broadcast data loading. If, however, Location Update Procedure related data loading is to be implemented then map data covers an extent where the particular location area is at the centre. The loadable data can be prepared at internet sites serving to GSM/UMTS broadcast service.

Previous to the loading of data a check on the possibly already existing data version can be performed, for example based on version number, date of data version to be loaded etc. Only the data not already available in the mobile station are loaded and stored in the mobile station, preferably even after switch off of the mobile station. Various loading possibilities exist, for example:

(a) Loading via general broadcast by the mobile communication network system, for example similar to the videotext in the television system. The mobile station itself decides whether loading of data is required.

(b) Loading during a procedure which is called in the GSM/UMTS procedure as "location area update procedure", only if it is necessary. For example the mobile station sends the version number and/or date of data already available in the mobile station to the network system as part of the location update procedure and the network system decides and prompt if an update of said data already available in the mobile station is required.

(c) Loading on request of the mobile station. Either automatic loading of data according to the present location and/or loading of data of a location of particular interest.

(d) Loading of data according to specific circumstances for the mobile station, i.e. according to a travel modus, travel speed of the mobile station.

The information provided on the display means of the mobile station can further be depending on a selective category of interest, for example hotels in general or hotels of a specific hotel category can be marked on the displayed map, preferably together with the name or phone number of the hotel and/or the distance to the present location of the mobile station.

Following items can be provided as loadable information:
(i) Local Area Maps
(ii) Local Area Name Strings, i.e. street, coffer, building names
(iii) Local Area List
(vi) Local Area Categorical Information, such as banks, hotels, cinemas etc.
(vii) Local Area Active Information, Advertisement, et;

All the given information are either used in determining the location of the mobile station, or used to guide the owner of the mobile station.

For Loading of the GSM/UMTS/GPS Mobile End User Equipment with Maps and with Geographical Name String Tables, following options are possible:

(a) Only Maps and Geographical Name String Tables of the present Local Area, which contains one or more cells, are loaded. Therefore the loaded information size is small and manageable within short time interval.
(b) Mobile End User Equipment keeps all the loaded information, depending on its memory capacities, even when the devices power is turned off.
(c) Version or Date stamps are used on the loaded information items, so that an old version or an old dated information data can be replaced or the additional updates can be loaded.
(d) Whenever a Mobile End User Equipment enters into a new Local Area, it is required to inform its new location to the Network via an automatic signalling connection, which is called "Local Area Update Procedures" in GSM terminology. Mobile End User Equipment can send the version number or date of the already loaded information of the area, during these automatic local area update procedures to the network.
(e) Mobile End User Equipment can set-up a new connect procedure upon user request, to load the local area dependent information or the updates.
(f) Since only the most required and/or additional required localisation information is loaded to the mobile end user equipment, the translation of the GPS co-ordinates into maps and also assignment of street names, building names, and/or area names become an easier task.
(g) Localisation process, i.e. translation of GPS co-ordinates to maps and streets names, are done at the mobile without any intervention from network.

The geographical related base data can be loaded into said mobile station during a location update procedure and/or using a local area specific network system broadcast service. Thus, no telephone calls are necessary and corresponding costs are avoided. The received geographical related base data can be stored for example in a plug-in memory module. In addition, any time a geographical related base data download can be performed on request by the mobile station. Geographical related base data can be provided by the network system, for example by a dedicated information centre.

Mobile Station can display geographical related base data as a map and/or as a text string. The text string can be categorised, for example in categories "streets", "hotels", "restaurants", etc., and can provide guidance to new locations, information about events in the surrounding of the present geographical position of the mobile station, etc. without any direct active call to the network but in an idle mode of the mobile station with regard to the mobile communication network system.

The scale and/or the resolution of the map data and correspondingly of said map, displayed on said display means, can be adapted by the mobile station or adapt automatically to a travelling velocity and/or a present surrounding of said mobile station. For example in an urban environment the resolution of the map data should usually be higher than in a thinly populated country. Furthermore the travelling velocity can be calculated using the change in the geographical positions in time and can be used to decide automatically whether the mobile station is travelling by car, by railway, by plane or on foot. When the travelling speed is high the scale of said map displayed on said mobile station can be selected "high", whereas when the travelling speed is low, for example because the mobile station travels on foot, the scale of said map should be selected "low" and preferably the resolution should be selected high.

On the basis of the result of the travelling modus a type of map data and background information can be selected automatically by the mobile station. For example if the travelling modus is by railway, only the railways and railway stations can be displayed on the map and for the background information railway timetables of the nearby railway stations can be requested from the network system or selected out of the data provided by the network system broadcast service. If it can be decided that the mobile station is travelling by car, for example as background information traffic information and/or locations of petrol stations can be provided. Particularly when travelling with high speed th mobile station can predict, particularly using travelling modus and/or travelling direction, map data required in the near future, for example data of the forthcoming Local Area, if such data is not already available in said mobile station. Furthermore the travelling distance, average and top speed, etc. can be calculated and displayed by the mobile station.

The mobile station has an internal clock or timer and scans periodically it's geographical position changes both in terms of distance and direction and registers the distance per given time unit, e.g. seconds, minutes or hours. If the mobile station comprises a GPS module, these calculations are easy to perform. If the position of the mobile station is calculated using GSM/UMTS based measurements, the results of the calculation have to be translated into geographical coordinates. This can be performed easily in those cases, in which the base station antennas of the network systems provide geographical position information as a broadcast service. In other cases, an extra information table with geographical positions of different locations within the present cell or preset local area needs to be loaded into the mobile station too, in order to be able to calculate the present geographical position of the mobile station. Using the information calculated by the mobile station present, top and average speed can be determined, traveled distance for a starting position or point in time, estimation of arrival time to a given destination, etc.

If the mobile station is operated in a vehicle, it can be used to limit the speed of the vehicle according to the present traffic conditions. Mean accidents are caused by excessive speed particularly in motor traffic. Although for certain motorways there might be no need for a speed limit in principle, depending on present traffic and/or weather conditions such a speed limit is necessary, for example in the case of an accident, road repair, mist, rain etc. On receiving the corresponding information from the network system the mobile station can control the vehicle in which it is used by wired or wireless connection in order to adapt the speed of the vehicle to the given traffic and/or weather conditions. For example the mobile station can be coupled to engine speed control of the vehicle in such a way that it does not allow any faster driving than according to the information concerning allowed speed received by the mobile station at its present position by the network system. For the determination of the speed of the vehicle either the speedometer of the vehicle itself or the calculation performed by the mobile station can be used, which ever is more accurate and reliable. Mobile station can also be used as for remotely controlling further functions of the vehicles and oth machines, such as the movement direction, in addition to speed control. With increased localising precision, this would achieve a better control of the traffic and higher standards of living and quality of life.

The mobile station according to the present invention is able to give directional information based on destination information and information concerning its present location. The mobile station can provide the best possible route since the needed information is loaded per location and the traffic information can be attached to the local area information. From the broadcasted information of traffic jam, reroutes etc., the mobile satiation can filter and display only such information that is relevant for the mobile station according its present location, present travel direction, present travel speed, and/or given destination. This filtering of information is performed at the mobile station only and thus the user of the mobile station receives only the relevant traffic information and is particularly not bothered with irrelevant general traffic information.

The geographical co-ordinates and location name strings are made available to be sent in SMS messages and/or to the called parties during the call set-up, if not restricted by the user. This is called the "presentation of calling party location". If restricted, then it is called "restriction of calling party location". Further depending on the location information being geographic co-ordinates or name sting, following naming conventions are used:

Presentation/Restriction of Calling Party Location Name

Presentation/Restriction of Calling Party Location Co-ordinates

Callers SETUP message contains either calling party location name string or co-ordinates or both, before it is sent to the called party. Mobil end user can disable this feature if wanted. Additionally Mobile End User can be required to register these as network features, either to send the location info or to block it. These are similar features to the existing "presentation/restriction of calling/called numbers" and handled also similarly.

Similarly if the called party SETUP-ACK contains the called party location info, this could be displayed too if not restricted/blocked at the mobile end equipment. This presentation/restriction of called party location information may also be handled as registered features at the network. If so, the presentation maybe allowed or blocked already at the network side.

Within this application the following abbreviations are used:
Cd compact disk
GSM global system for mobile communications
GPS global positioning system
MS mobile subscriber (person) or mobile End User Equipment (equipment)
SMS short message service
UMTS universal Mobile Telecommunication Systems Only for the purpose of easy understanding the present standards of mobile communication GSM and UMTS are used which does not limit the scope of the present invention.

What is claimed is:

1. A mobile station (1) of a mobile communication network system (2), said mobile station (1) comprising a geographical position localising module (3) for localising a geographical position (24c) of said mobile station (1), storage means for storing geographical related base data, and display means (4) for displaying geographical related base data as a nap (24) or as a text string, wherein said geographical related base data displayed on said display means (4) has been at least partly provided by wireless transmission from said network system (2) and is limited to a pre determinable extent depending on said geographical position (24c) of said mobile station (1), where said mobile station (1) is characterised by that:

said geographical related base data displayed on said display means (4) has been at least partly provided by a Network Broadcast Service, a check is performed by said mobile station (1) whether said geographical related base data provided or to be provided by wireless transmission is already available at said mobile station (1) and subsequently loading data in said mobile station is performed only if no corresponding data are available or if data available at said mobile station (1) are not of the latest version, said geographical related base data are stared at said mobile station (1) even after power-off, the amount of said stored data depending on the availability of memory capacity of said mobile station (1), loading of said data is done according to specific circumstances for said mobile station (1), including a travel modus and a travel speed of said mobile station (1), said geographical position localising module (3) is a Global Positioning System (GPS) module providing position information as geographical coordinates or a GSM/UMTS localising system for mobile stations, mobile station (1) itself performs calculation of the geographical position and assistance from said network system (2) is only performed by said general broadcast information of normal operation and location dependent information to all mobile stations within a cell of said network system (2), said geographical position or localisation data of said mobile station (1) can be sent by said mobile station (1) to others as a location name strings or geographical co-ordinates, by using short message service (SMS) or according to set-up during the active cal set-up phase the set-up specifics presentation or restriction of calling or called mobile station geographic position, said mobile station (1) displays a position marked out map (24), a position text string, or Local Area information data at an idle mode, i.e. at a standby mode, said mobile station (1) comprising calculation means for calculating travelling parameters as location, speed, distance, direction and time values of the traveling mobile station (1), said mobile station (1) displays on said display means (4) said travelling parameters, a scale of said map (24) or said geographical related base data displayed on said display means (4) depends and preferably adapts automatically to a travelling speed or a present surrounding of said mobile station (1), a direction to go from the location of said mobile station (1) is calculated by a navigational algorithm implemented in location finder module (31) of said mobile station (1) and said direction is indicated on said display means (4) of said mobile station (1), directional information based on destination information and information concerning present location of said mobile station (1) is given by said mobile lion (1), a best possible route is provided by said mobile station (1) since the needed information is loaded per location and the traffic information can be attached to said local area information, and said mobile station (1) can filter and can display only such information that is relevant for said mobile station (1) according to its present location, present travel direction present travel speed, or given destination.

2. Mobile Station (1) of claim 1, characterised in that said geographical related base data displayed on said display means (4) has been at least partly provided by a Location Update Procedure, or by a Network Service Call.

3. Mobile station (1) of claim 1, characterised in that said limited extent of said geographical related base data displayed on said display means (4) is pre selectable by said mobile station (1).

4. Mobile station (1) of claim 1, characterised in that said geographical related base data displayed on said display means (4) is limited according to the present Cell or Local Area of said mobile station (1).

5. Mobile Station (1) of claim 1 characterised in that said mobile station (1) receives broadcasted traffic information and controls a travelling speed of a vehicle of said mobile station (1) or guides said vehicle according to said traffic information.

6. Mobile Station (1) of claim 1, characterised in that said mobile station (1) controls by wired or wireless connection a vehicle (50) in which said mobile station (1) is operated in order to adapt the speed of said vehicle (50) upon receiving from said network system (2) information about the given traffic or weather conditions.

7. Mobile Station (1) of claim 5, characterised in that said mobile station (1) can also be used as for remotely controlling further functions of said vehicle (50) including the movement direction.

8. Mobile station (1) of one of claims 6, characterised in that forthcoming geographical related base data to be displayed on said display means (4) are requested from said network system (2) by a Network service Call.

9. A mobile communication network system (2) comprising a plurality of mobile stations, at least one (1) of said mobile stations comprising a geographical position localising module (3) for localising a geographical position (24c) of said mobile station (1), storage means for storing geographical related base data, and display means (4) for displaying geographical related base data as a map (24) or as a text string, wherein said geographical related base data displayed on said display means (4) has been at least partly provided by wireless transmission from said network system (2) and is limited to a pre determinable extent depending on said geographical position (24c) of said mobile station (1), where said mobile station (1) is characters by that:

said geographical related base data displayed on said display means (4) has been at least partly provided by a Network Broadcast Station a check is performed by said mobile station (1) whether said geographical related base data proud or to be provided by wireless transmission is already available at said mobile station (1) and subsequently loading data in said mobile station is performed only if no corresponding data are available or if data available at said mobile station (1) are not of the latest version, said geographical related base data are stored at said mobile station (1) even after power-off, the amount of said stored data depending on the availability of memory capacity of said mobile station (1), loading of said data is done according to specific circumstances for said mobile station (1), including a travel modus and a travel speed of said mobile station (1), said geographical position localising module (3) is a Global Positioning System (GPS) module providing position information as geographical coordinates or a GSM/UMTS localising system for mobile stations, mobile station (1) itself preforms calculation of the geographical position and assistance from said network system (2) is only performed by said general broadcast information of normal operation and location dependent information to all mobile stations within a oil of said network system (2), said geographical position or localisation data of said mobile station (1) can be send by said mobile station (1) to others as location name strings or geographical co-ordinates by using short message service (SMS) or according to set-up during the active call set-up phase; the set-up specifcs presentation or restriction of calling or called mobile station geographic position, said mobile station (1) displays a position marked out map (24), a position text string, or Local Area information data at an idle mode, i.e. at a standby mode, said mobile station (1) comprising calculation means for calculating travelling parameters of the travelling mobile station (1), such as speed, distance, direction or time values, said mobile station (1) displays on said display means (4) said travelling parameters, a scale of said map (24) or said geographical related base data displayed on said display means (4) depends and preferably adapts automatically to a traveling speed or a present surrounding of said mobile station (1), a direction to go from the location of said mobile station (1) is calculated by a navigational algorithm implemented in location finder module (31) of said mobile station (1) and said direction is indicated on said display means (4) of said mobile station (1), directional information based on destination information and information concerning present location of said mobile station (1) is given by said mobile station (1), a best possible route is provided by said mobile station (1) since the needed information is loaded per location and the traffic information can be attached to said local area information, and said mobile station (1) can filter and can display only such information that is relevant for said mobile station (1) according to its present location, present travel direction, present travel speed, or given destination.

10. A method of operating a mobile communication network system (2) comprising at least one mobile station (1), said mobile station (1) comprising a geographical position localising module (3) for localising a geographical position (24c) of said mobile station (1), storage means for storing geographical related base data, and display means (4) for displaying geographical related base data, as a map (24) or as a text string, wherein said geographical related base data displayed on said display means (4) has been at least partly provided by wireless transmission from said network system (2) and is limited to a predeterminable extent depending on said geographical position (24c) of said mobile station (1), where said mobile station (1) is characterised by that said geographical related base data displayed on said display means (4) has been at least partly provided by a Network Broadcast Service, a check is performed by said mobile station (1) whether said geographical related base data provided or to be provided by wireless transmission is already available at said mobile station (1) and subsequently loading data in said mobile station is performed only if no corresponding data are available or if data available at said mobile station (1) are not of the latest version, a said geographical related base data are stored at said mobile station (1) even after power-off, the amount of said stored data depending on the availability of memory capacity of said mobile station (1), loading of said data is done according to specific circumstances for said mobile station (1), including a travel modus and a travel speed aid mobile station (1), said geographical position localising module (3) is a Global Positioning System (GPS) module providing position information as geographical coordinates or a GSM/UMTS localising system for mobile stations, mobile station (1) itself performs calculation of the geographical position and assistance from said network system (2) is only performed by said general broadcast information of normal operation and location dependent information to all mobile stations within a cell of said network system (2), said geographical position or localisation data of said mobile station (1) can be send by said mobile station (1) to others as location name strings or geographical coordinates, by using short message service (SMS) or according to set-up during the active call set-up phase; the set up specifies presentation or restriction of calling or called mobile station geographic position, said mobile station (1) displays a position marked out map (24), a position text string, or Local Area information data at an idle mode, i.e. at a standby mode, said mobile station (1) comprising calculation means for calculating travelling parameters of the travelling mobile station (1), such as speed, distance, direction or time values, said mobile station (1) displays on said display means (4) said travelling parameters, a scale of said map (24) or said geographical related base data displayed on said display means (4) depends and preferably adapts automatically to a travelling speed or a present surrounding of said mobile station (1), a direction to go from the location of said mobile station (1) is calculated by a navigational algorithm implemented in location finder module (31) of said mobile station (1) and said direction is indicated on said display means (4) of said mobile station (1), directional information based on destination information and information concerning present location of said mobile station (1) is given by said mobile station (1), a best possible route is provided by said mobile station (1) since the needed information is loaded per location and the traffic information can be attached to said local area information, and said mobile station (1) can filter and can display only such information that is relevant for said mobile station (1) according to its present lation, present trawl direction, present travel speed, or given destination.

* * * * *